United States Patent [19]
Berry et al.

[11] Patent Number: 6,104,406
[45] Date of Patent: Aug. 15, 2000

[54] BACK AWAY NAVIGATION FROM THREE-DIMENSIONAL OBJECTS IN THREE-DIMENSIONAL WORKSPACE INTERACTIVE DISPLAYS

[75] Inventors: Richard Edmond Berry; Scott Harlan Isensee, both of Georgetown, Tex.; David John Roberts, Stockton, United Kingdom

[73] Assignee: International Business Machines Corporation, Armonk, N.Y.

[21] Appl. No.: 08/835,145

[22] Filed: Apr. 4, 1997

[51] Int. Cl.⁷ .................................................. G06F 3/00
[52] U.S. Cl. .......................... 345/427; 345/355; 345/422
[58] Field of Search .................................. 345/427, 419, 345/355, 438, 418

[56] References Cited

U.S. PATENT DOCUMENTS

| | | | |
|---|---|---|---|
| 5,276,785 | 1/1994 | Mackinlay et al. | 395/127 |
| 5,297,043 | 3/1994 | Tuy et al. | 345/427 |
| 5,325,472 | 6/1994 | Horiuchi et al. | 345/427 |
| 5,339,390 | 8/1994 | Robertson et al. | 395/157 |
| 5,442,456 | 8/1995 | Hansen | 358/342 |
| 5,513,303 | 4/1996 | Robertson et al. | 345/419 |
| 5,528,735 | 6/1996 | Strasnick et al. | 395/127 |
| 5,533,183 | 7/1996 | Henderson, Jr. et al. | 345/344 |
| 5,555,354 | 9/1996 | Strasnick et al. | 395/127 |
| 5,574,836 | 11/1996 | Broemmelsiek | 345/427 |
| 5,684,937 | 11/1997 | Oxaal | 345/427 |
| 5,689,628 | 11/1997 | Robertson | 345/427 |

*Primary Examiner*—Matthew M. Kim
*Assistant Examiner*—Tadesse Hailu
*Attorney, Agent, or Firm*—J. B. Kraft; Volel Emile

[57] ABSTRACT

A system, method and computer program are provided for user navigation within a virtual reality three-dimensional workspace containing functional three-dimensional objects. The viewer navigates from an initial viewpoint interface through a sequence of viewpoints, which sequence the system records. When the viewer has completed his accessing of a functional object for whatever purpose, he has the option of triggering a backout sequence. If the viewer triggers such a sequence, the system will backout from the accessed objects through the sequence of recorded viewpoints in reverse order. At any one of these viewpoints during the backout, the viewer has the option of interrupting the reverse or backout sequence and proceeding to any viewpoint he may desire in another direction.

11 Claims, 7 Drawing Sheets

BACK AWAY NAVIGATION FROM THREE-DIMENSIONAL OBJECTS IN THREE-DIMENSIONAL WORKSPACE INTERACTIVE DISPLAYS

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/813,891 (Attorney Docket No. AT9-96-310), entitled "VIEWER INTERACTIVE OBJECT IN VIRTUAL THREE-DIMENSIONAL WORKSPACE" and Ser. No. 08/813,848 (Attorney Docket No. AT9-96-311), entitled "VIEWER INTERACTIVE OBJECT WITH MULTIPLE SELECTABLE FACE VIEWS IN VIRTUAL THREE-DIMENSIONAL WORKSPACE", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication,* Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations. The invention facilitates the user's navigation in the 3D space so that the user may easily keep track of his planned routes through this three-dimensional workspace, particularly when the user moves off of his planned route to access or to specifically functionally relate to specific objects in the workspace.

SUMMARY OF THE INVENTION

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused on the direction in which the viewer or user is interactively navigating and to choose the user's path as well as branches in the path as easily and quickly as possible.

The present invention deals with viewer navigation and addresses the problem of helping the viewer who is navigating through the three-dimensional workspace to return to his planned path through the workspace after the viewer has taken a detour or branched off his route to access a particular object in the three-dimensional workspace. Then, when the viewer is ready to return to his planned route, the system provides to the viewer a sequence of viewpoints of increasingly widening scope backing away from the starting viewpoint at which the viewer was when he was originally accessing or addressing the object. For example, if the starting viewpoint was primarily that of a notebook object, the next viewpoint in the backoff sequence could be a desktop containing a notebook, as well as other three-dimensional objects such as a telephone or a computer. In such a case, the next object viewpoint in the backoff sequence would be the office containing the desk, then the next viewpoint in the sequence could be a hallway in a building containing many such offices.

At any point in this backoff sequence, the viewer or user could interrupt the sequence and continue with an earlier planned path. For example, if the viewer initially entered a first office and then found it necessary to interactively access a notebook on a desk in that first office, then during the backoff sequence when he reached the hallway, he could interrupt the sequence and continue on his planned path, e.g. down the hallway to a different office. As may be noted, in accordance with a preferred aspect of the present invention, the computer system of the present invention keeps track of the path of the user to get to the initial point in the sequence. Then, during the backoff process, the system would back out by reversing the progressively narrowing viewpoint sequence which led up to the notebook on the desk in order to achieve the progressively widening backoff sequence.

DETAILED DESCRIPTION OF THE PREFERRED EMBODIMENT

Figure 1:
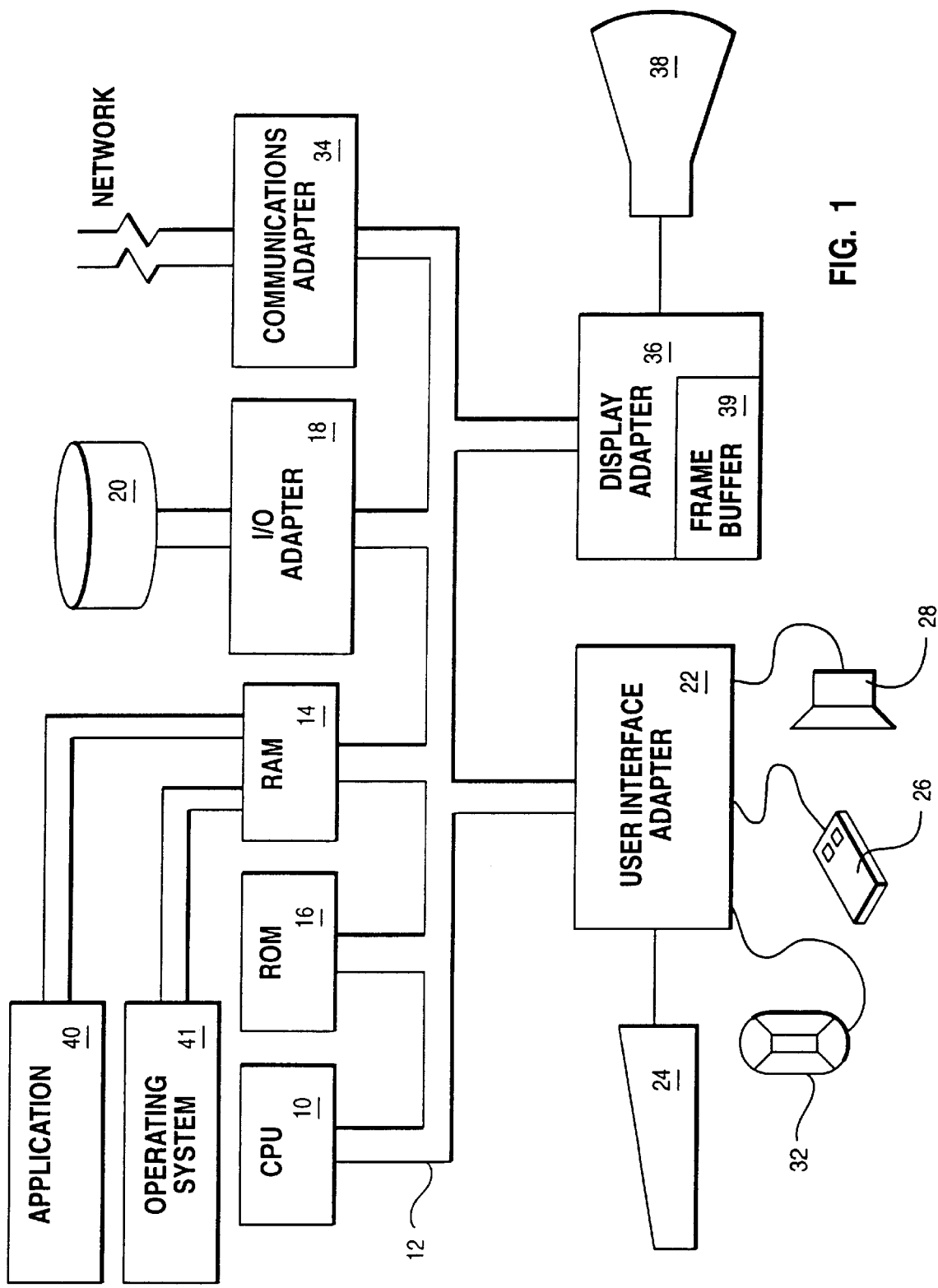
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse preexisting programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in which application 40 operates.

Figure 2:
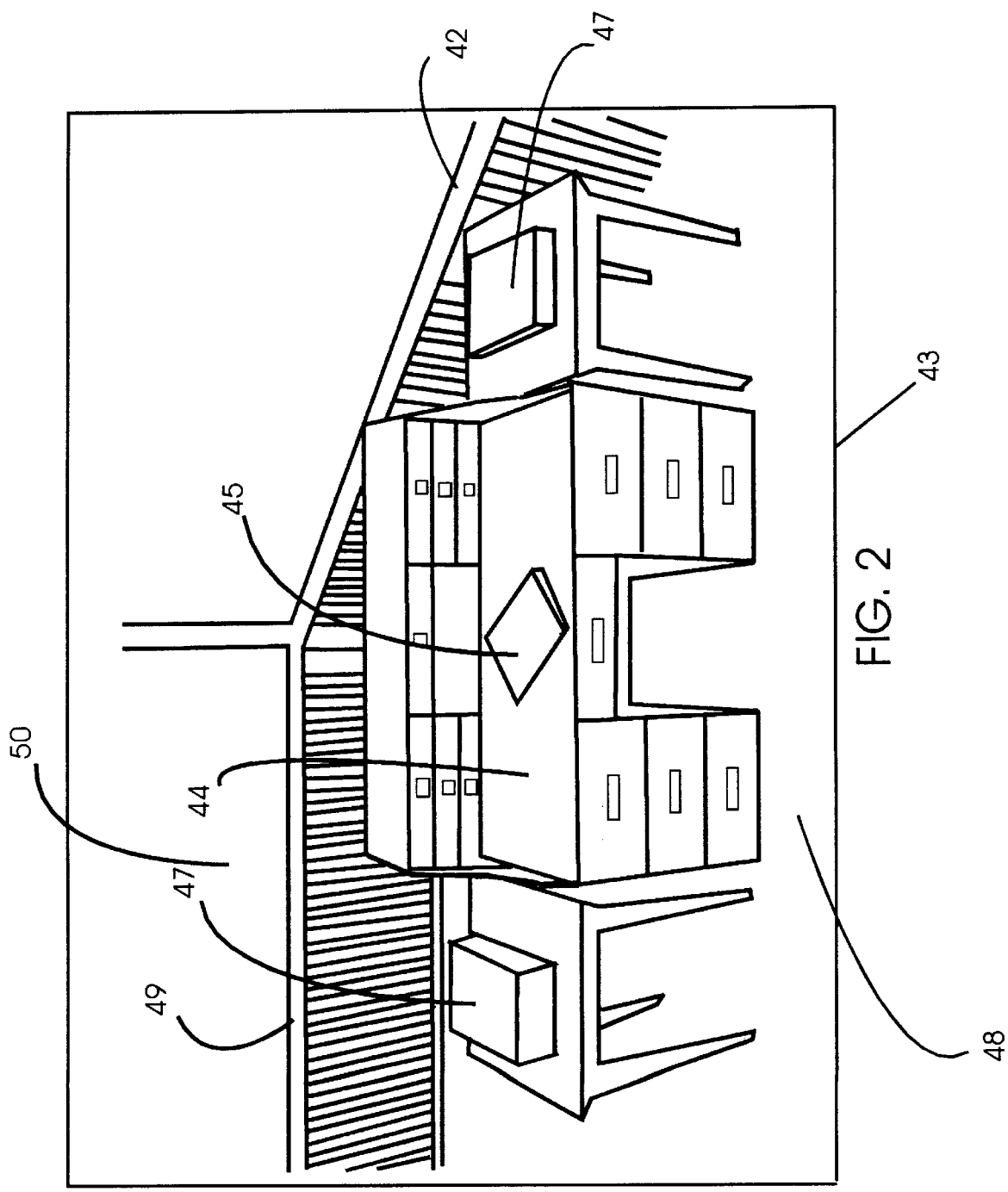
FIG. 2 shows the virtual reality workspace in accordance with the present invention at an initial viewpoint before navigation and before the backout procedure of the present invention takes place.

An embodiment will now be described with respect to an initial virtual reality three-dimensional workspace as shown in FIG. 2. The workspace shown in FIG. 2 which has been designated workspace 42 is portion of a much greater virtual reality workspace, which will be understood to include various indoor and outdoor structures such as offices, living areas, entertainment areas, buildings, roads, etc. With all of those possibilities and possible paths, it may be readily seen how this virtual reality three-dimensional world is potentially quite complex and confusing to the viewer. The present invention is directed to making this world less confusing to the viewer by helping the viewer keep track of his planned path during a variety of detours or branches from his path. The present invention accomplishes this by keeping track of where the viewer has been on his path and then, when the viewer has completed a particular excursion or exploration down a particular side path, it returns the viewer to his original path through a series of navigation viewpoint backoffs.

In any event, let us return to the image in FIG. 2 which we will regard for purposes of this illustration as an initial viewpoint 43 into workspace 42 which includes a desk 44, a book on the desk 45, some ancillary office equipment such as dictating machine 46 and telephone answering machine 47. There is also office floor or platform 48, as well as an external environment made up of railing 49 and external space 50. The initial viewpoint 43 is presented to the viewer on a display interface such as that which could be shown on display monitor 38 of FIG. 1. In accordance with conventional techniques, the user may control the viewpoint through conventional I/O devices such as mouse 26 in FIG. 1 which operates through user interface 22 to call upon the VRT programs in RAM 14 cooperating with the operating system 41 to create the images in frame buffer 39 of display adapter 36 to control the display on monitor 38. Using conventional virtual three-dimensional workspace navigation techniques, the viewpoint interface of the user shown in FIG. 2 is changeable as the user moves closer to or backs away from objects in the workspace or moves to the right or left or up or down in the workspace. All this may be controlled by suitable conventional I/O devices such as mouse 26 of FIG. 1.

Figure 3:
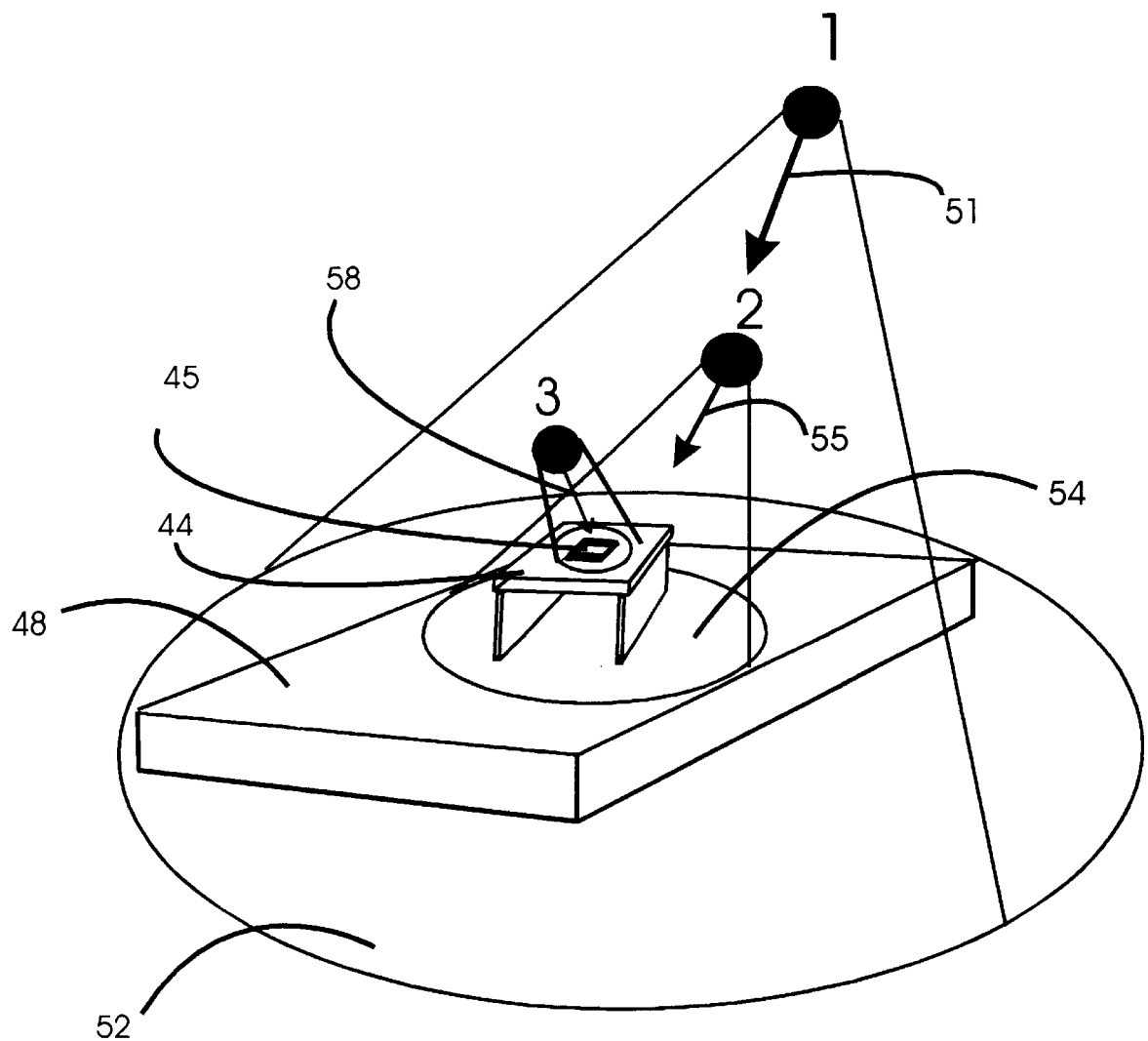
FIG. 3 is a diagrammatic representation of a portion of the workspace of FIG. 2 with several incremental navigation stages so as to illustrate the recorded sequence of navigation changes in accordance with the present invention.
Figure 4:
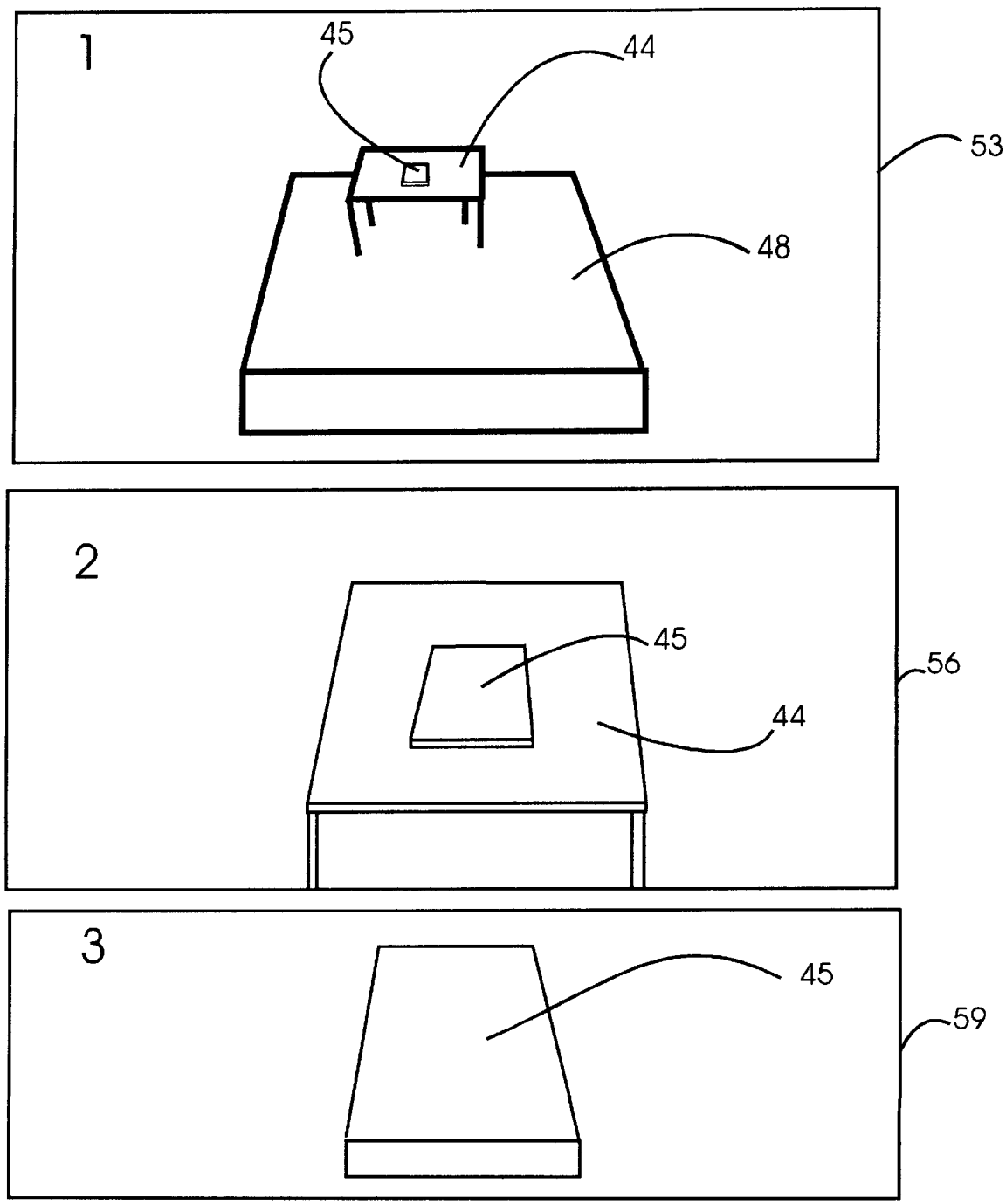
FIG. 4 is a sequence of viewpoints described with respect to FIG. 3 which sequence may be recorded and carried out in reverse order during the backout procedure of the present invention.

In order to explain the present invention in as simple a manner as possible, we have reduced the office environment shown in FIG. 2 to the diagrammatic versions shown in FIGS. 3 and 4. Now, with reference to FIG. 3, the initial viewpoint 43 of FIG. 2 is diagrammatically shown as being viewed in apparent three-dimensional workspace from the point represented by the point designated by the bold numeral 1 in FIG. 3 and in the direction shown by arrow 51. This provides an apparent viewpoint having the scope of circle 52 in FIG. 3. This viewpoint is diagrammatically shown as viewpoint 53 in stage one of FIG. 4. Next, assuming that the viewer navigates to the point designated by bold numeral 2 in FIG. 3, the result is a narrower viewpoint as indicated by circle 54 in FIG. 3 and in the direction of arrow 55. This provides the viewpoint designated in stage 2 of FIG. 4, viewpoint 56. It should be noted that the viewpoint has substantially narrowed from viewpoint 53, FIG. 4, which shows a general view of the desk 44, the book 45 and the floor or platform 48 to a view of essentially the desktop 44 with the book 45 on it in viewpoint 56.

Then as the next step, FIG. 3, the viewer again alters his viewpoint to that bold roman numeral 3 in FIG. 3 where the scope of the viewpoint is designated by circle 57 in the apparent direction shown by arrow 58 of FIG. 3, which is actually viewpoint 59 in stage 3 of FIG. 4 which is the narrowest viewpoint and essentially focuses on the book 45 itself. This may be considered as a working viewpoint.

As stated earlier and as will be seen with respect to the flowcharts of FIGS. 5A, 5B and 5C, to be subsequently described, the system has been storing the paths of navigation, i.e. the path from viewpoint 53 through viewpoint 56 to final viewpoint 59 at stages 1, 2 and 3 of FIG. 4. Now, when the viewer has completed his function with respect to book 45 in viewpoint 59 of FIG. 1, the viewer triggers a backout procedure wherein the sequence of viewpoints is automatically reversed, i.e. from viewpoint 59 through viewpoint 56 to viewpoint 53, FIG. 4. At any one of these viewpoints, the viewer may interrupt the backout sequence and select a different viewpoint and proceed in a particular direction dependent upon the different viewpoint selected.

With this procedure in mind, attention should proceed to FIGS. 5A, 5B and 5C where there will be described a process implemented by the present invention. The flowcharts are in three parts: FIG. 5A describes the steps relating to the development of the virtual reality landscape, the provision navigation, the provision of means of storing and recording viewpoint change navigation sequences, as well as means for automatically reversing the recorded stored sequences of navigation viewpoint changes. FIGS. 5B and 5C relate to specific programs run within such landscapes in accordance with the present invention.

Figure 5A:
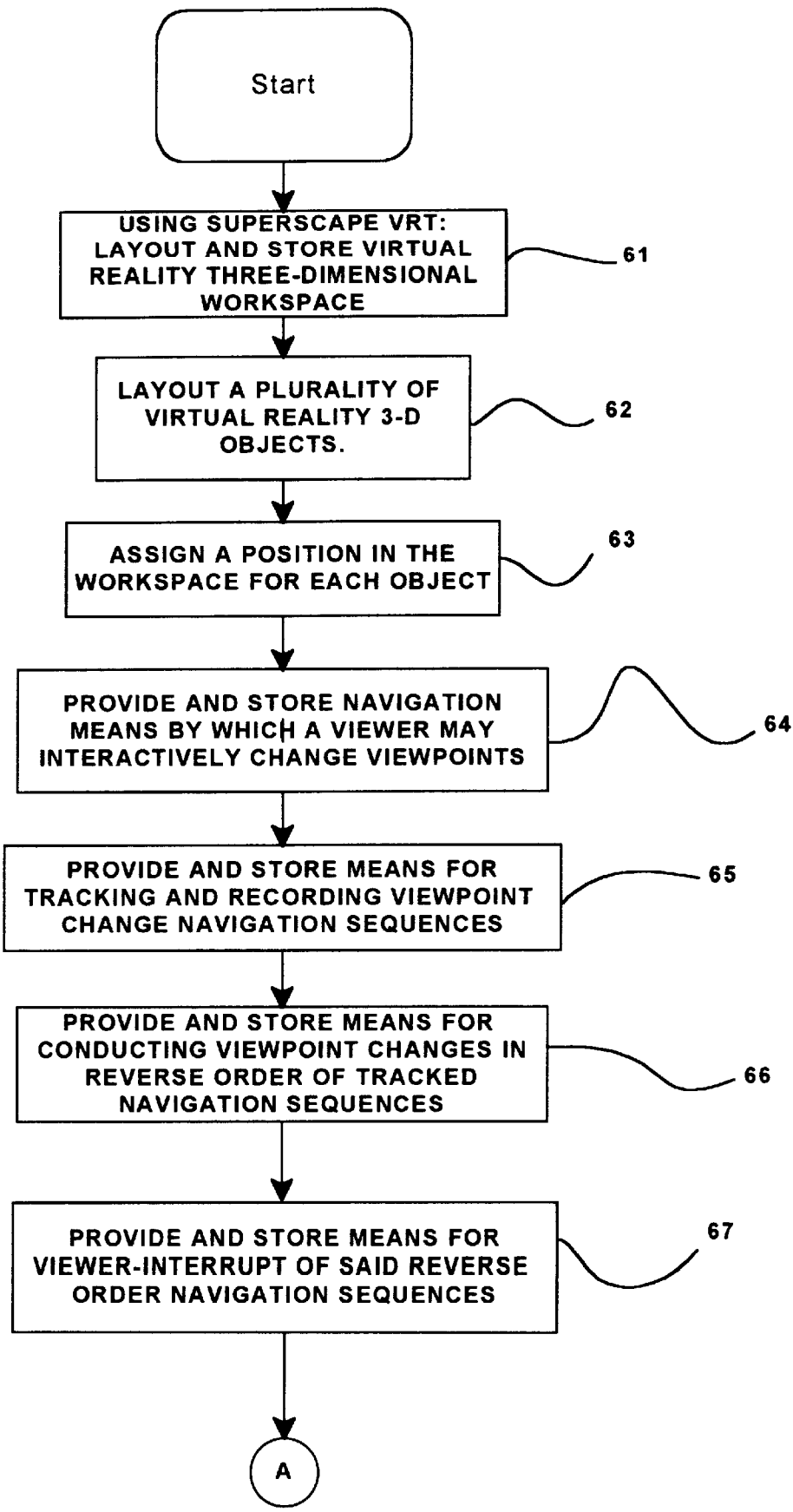
FIG. 5A is a flowchart of the process implemented by the present invention for developing the layout and navigation software tools used in practicing the present invention.

Thus, with reference to FIG. 5A first, step 61, the desired virtual reality three-dimensional workspace, for example workspace 42 shown in FIG. 2, is created and stored. Next, step 62, the virtual reality objects are created and laid out. Next, step 63, the object oriented program described above assigns and stores for each object a permanent coordinate position in the above-described virtual workspace. Next, step 64, there is provided an stored navigation means for changing the viewpoint of the viewer at the display interface responsive to the viewer interactively selecting a viewpoint change. Next, step 65, means are provided for tracking and recording viewpoint change navigation sequences. Next, step 66, means are provided for conducting the viewpoint changes in the reverse order of the track and store navigation sequences. Finally, step 67, means are provided for the viewer interrupting any of said reverse order navigation viewpoint change sequences and permitting the user to proceed with a viewpoint change which results in navigation in a different direction.

Figure 5B:
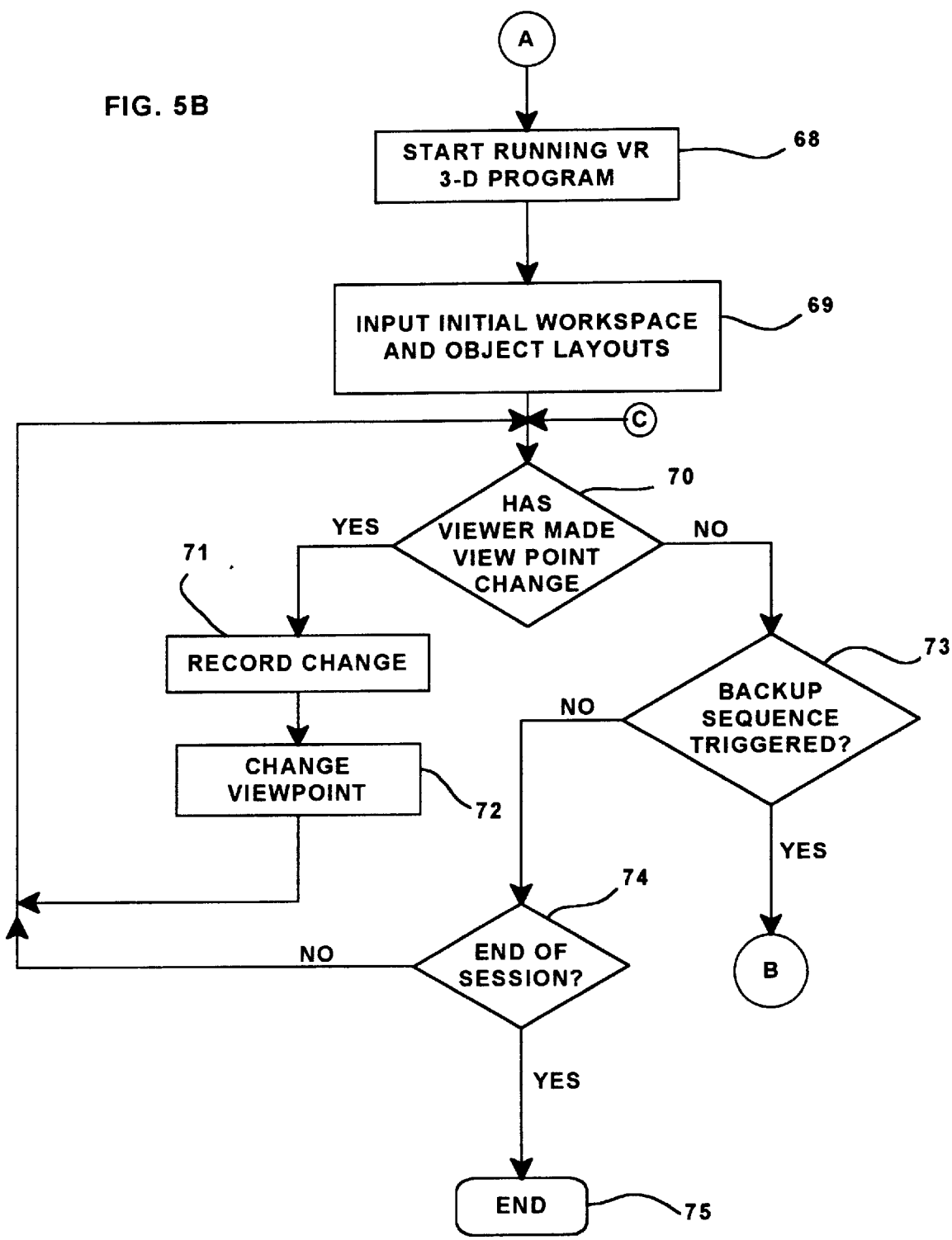
FIG. 5B is a program run in accordance with the present invention wherein a sequence of navigational changes of viewpoints are recorded.

The process now proceeds to point A in FIG. 5B whereat the created virtual reality workspace navigation program is run, step 68. As previously mentioned, the program is run on a system such as that shown in FIG. 1 with the particular application program 40 being loaded in RAM 14 connected to display buffer 36 which forms the stored images within frame buffer 39 controlling display monitor 38. The program initially sets up the workspace layout on the display, step 69. Then, step 70, a determination is first made as to whether the viewer has made a viewpoint change. If the viewer has made a change, the change is recorded, step 71, and the viewpoint is changed, step 72. After which the system is returned to decision block 70 where a determination is made as to whether a subsequent viewpoint change is made. Thus, if there are a sequence of viewpoint changes, all of these changes are recorded in step 71. On the other hand, if the decision from decision block 70 is that there is no viewpoint change, then a determination is made as to whether the backoff sequence has been triggered, step 73. If the decision from decision block 73 is that no backoff sequence has been triggered, the system proceeds to decision block 74 where a determination is made as to whether the session is over. If it is, then it is ended, step 75. If the session is not over, then the system loops back to decision block 70 where a determination is made once again as to whether the viewer has now made a viewpoint change.

Figure 5C:
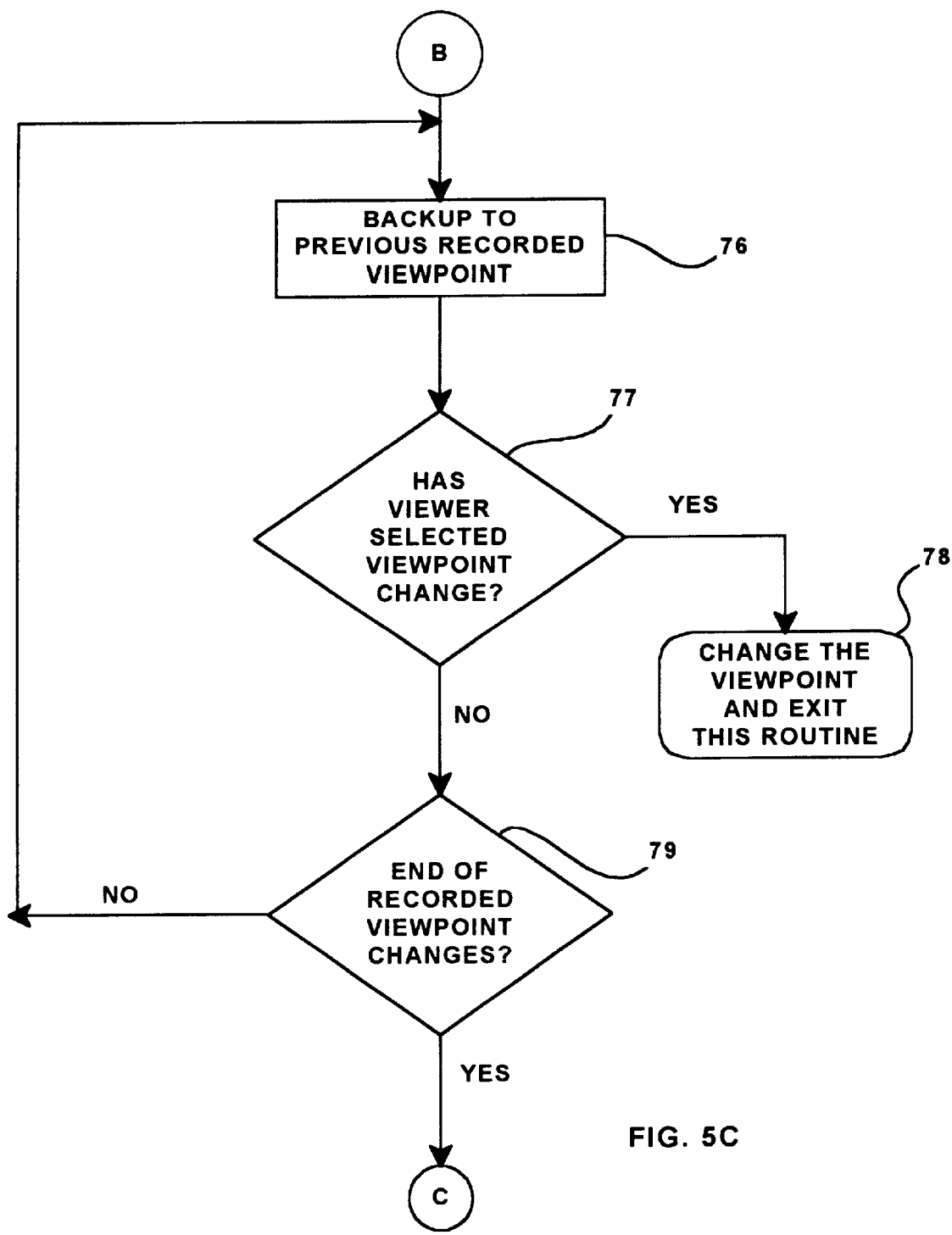
FIG. 5C is a program in accordance with the present invention wherein the navigational changes in viewpoint recorded using the program of FIG. 5B are carried out in reverse order during a backout procedure in accordance with the present invention.

Again, if the decision from decision block 73 is that a backoff sequence has been triggered, the system then proceeds to entry point B in FIG. 5C where the backoff routine is run. First, step 76, the viewpoint is backed off to the previous viewpoint in the recorded sequence. Then, decision block 77, a determination is made as to whether the viewer has selected a viewpoint change. If the viewer has selected a viewpoint change, this viewpoint change is implemented, step 78, and the backoff routine is completed and exited from and the viewer is permitted to proceed on his desired path. On the other hand, if in decision block 77 the viewer has not selected a viewpoint change which would interrupt the reverse sequence of recorded changes, a decision is made in decision block 79 as to whether there are any further recorded viewpoint changes, i.e. end of recorded changes. If the decision is no, i.e. there are still further viewpoint changes, then the system is returned to step 76 and a backoff is made to the previous recorded position, etc. Thus, the system is backed out through the sequence of recorded viewpoint navigation changes in reverse until, in decision block 79, it is determined that this is the end of the recorded viewpoint changes. In such a case, the system is returned to point C in FIG. 5B where a determination is made via decision block 70 as to whether the viewer has made a viewpoint change.

It should be understood that at any point in the backout procedure, as indicated by decision block 77, the viewer is given the opportunity of interrupting the backout procedure and proceeding along any desired path of viewpoint change navigation.

Although certain preferred embodiments have been shown and described, it will be understood that many changes and modifications may be made therein without departing from the scope and intent of the appended claims.

What is claimed is:

1. In a data processor controlled display system for displaying a virtual three-dimensional workspace having virtual three-dimensional viewer interactive objects within said workspace,
   viewer interactive means for navigating within said workspace comprising:
   means for selectively providing to the viewer a plurality of viewpoints of varying scope into said workspace,
   means for providing to the viewer a selected one of said viewpoints, and
   means for backing the viewer away from said one viewpoint by providing the viewer with a sequence of prerecorded viewpoints of increasingly widening scope.

2. The data processor controlled display system of claim 1 wherein said one viewpoint provides the viewer with an interactive workview of a selected object.

3. The data processor controlled display system of claim 1 further including means permitting the viewer to interactively interrupt said sequence of viewpoints at any viewpoint in the sequence and to navigate to a viewpoint selected by the viewer.

4. The data processor controlled display system of claim 1 wherein said means for backing the viewer away includes means for tracking and recording a sequence of viewpoints of progressively narrowing scope navigated by the viewer in reaching said one viewpoint and then backing said viewer away from said one viewpoint reversely through said record sequence of narrowing scope viewpoints.

5. In a computer implemented method for displaying a virtual three-dimensional workspace having virtual three-dimensional viewer interactive objects within said workspace,
   a method of viewer interactive navigation within said workspace comprising:
   selectively providing to the viewer a plurality of viewpoints of varying scope into said workspace,
   providing to the viewer a selected one of said viewpoints, and
   backing the viewer away from said one viewpoint by providing the viewer with a sequence of prerecorded viewpoints of increasingly widening scope.

6. The method of claim 5 wherein said one viewpoint gives the viewer an interactive workview of a selected object.

7. The method of claim 5 further including the step of permitting the viewer to interactively interrupt said sequence of viewpoints at any viewpoint in the sequence and to navigate to a viewpoint selected by the viewer.

8. The method of claim 5 further including the steps of:
   tracking and recording a sequence of viewpoints of progressively narrowing scope navigated by the viewer in reaching said one viewpoint, and
   then backing said viewer away from said one viewpoint through said recorded sequence of viewpoints of narrowing scope in reverse.

9. A computer program having data structures included on a computer readable medium which causes the display on a data processor supported display of a virtual three-dimensional workspace having virtual three-dimensional viewer interactive objects with said workspace, and including
   viewer interactive means for navigating within said workspace comprising:
   means for selectively providing to the viewer a plurality of viewpoints of varying scope into said workspace,
   means for providing to the viewer a selected one of said viewpoints, and
   means for backing the viewer away from said one viewpoint by providing the viewer with a sequence of prerecorded viewpoints of increasingly widening scope.

10. The computer readable program according to claim 9 further including means permitting the viewer to interactively interrupt said sequence of viewpoints at any viewpoint in the sequence and to navigate to a viewpoint selected by the viewer.

11. The computer readable program according to claim 10 wherein said means for backing the viewer away includes means for tracking and recording a sequence of viewpoints of progressively narrowing scope navigated by the viewer in reaching said one viewpoint and then backing said viewer away from said one viewpoint reversely through said record sequence of narrowing scope viewpoints.

\* \* \* \* \*